United States Patent [19]

Allingham

[11] Patent Number: 4,895,904

[45] Date of Patent: Jan. 23, 1990

[54] PLASTIC SHEETING FOR GREENHOUSE AND THE LIKE

[76] Inventor: Yael Allingham, P.O. Box 14, Benyamina, Israel

[21] Appl. No.: 115,597

[22] Filed: Oct. 26, 1987

Related U.S. Application Data

[63] Continuation of Ser. No. 942,512, Dec. 16, 1986, abandoned, which is a continuation-in-part of Ser. No. 774,312, Sep. 10, 1985, abandoned.

[30] Foreign Application Priority Data

Jun. 9, 1984 [IL] Israel ............................................ 72879

[51] Int. Cl.$^4$ ............................ C08K 3/22; C08K 3/08
[52] U.S. Cl. ........................................ 523/135; 47/17; 47/19; 47/29; 47/31; 524/431; 524/440
[58] Field of Search ................ 523/125, 135; 524/431, 524/440; 47/17, 19, 29, 31, DIG. 11

[56] References Cited

U.S. PATENT DOCUMENTS

| | | | |
|---|---|---|---|
| 3,622,537 | 11/1971 | Needham et al. | 524/431 |
| 3,876,552 | 4/1975 | Moynihan | 252/587 |
| 4,134,875 | 1/1979 | Tapia | 47/9 |
| 4,250,076 | 2/1981 | McFarlane et al. | 524/105 |
| 4,310,596 | 1/1982 | Buskirk | 524/435 |
| 4,423,164 | 12/1983 | Bar | 47/29 |
| 4,424,292 | 1/1984 | Ravinovitch et al. | 524/431 |
| 4,559,381 | 12/1985 | Tapia et al. | 47/29 |
| 4,560,609 | 12/1985 | Fukushima et al. | 47/9 |
| 4,629,756 | 12/1986 | Kerbow | 524/440 |

FOREIGN PATENT DOCUMENTS 57-67669 4/1982 Japan .
57-78461 5/1982 Japan .

*Primary Examiner*—Veronica P. Hoke
*Attorney, Agent, or Firm*—Browdy and Neimark

[57] ABSTRACT

The invention relates to polymer sheets or films for use in greenhouses. The polymer sheets or films contain components which absorb or reflect in the near I.R. (NIR) i.e. in the 0.7 to 2.0$\mu$ region, and which transmit at least 75 percent in the photosynthesis active radiation (PAR) region, which is essentially the 0.4$\mu$ to 0.7$\mu$ region of the solar spectrum. The compositions of the invention contain UV radiation stabilizers. The NIR absorbers and reflectors in the films of the invention are certain specific oxides or metals in a very fine particle size, in the submicron or micron range.

11 Claims, No Drawings

PLASTIC SHEETING FOR GREENHOUSE AND THE LIKE

This is a continuation of application Ser. No. 942,512 filed Dec. 16, 1986, now abandoned, which is a continuation-in-part of application Ser. No. 774,312 filed Sept. 10, 1985, now abandoned.

FIELD OF THE INVENTION

There are provided novel polymeric compositions in sheet or film form for use in agriculture, in greenhouses, tunnels or the like which are used for cultivating agricultural crops. The novel films or sheets transmit a larger part (above 70%) of the photosynthetic active (PAR) radiation, mainly in the visible part of the spectrum, while blocking out a substantial part of at least about 10% of the near infra red (NIR) and far-red radiation Solar radiation contains about 40% of its energy in the near I.R. i.e. in the region of about $0.7\mu$ to about $2\mu$ and nearly 60% in the visible range in the $0.4\mu$ to $0.7\mu$(400 nm to 700 nm) range, with some 2 to 3% of the energy being in the UV. During daytime, solar radiation does not provide energy in the IR region. During nighttime the interior of a greenhouse is relatively warm. Assuming a temperature of about 15° C. the black body radiation will be mainly in the $7\mu$ to $20\mu$ range, with a maximum at about $10\mu$.

By reflecting or absorbing a substantial percentage of the NIR radiation, less heating of the interior of the greenhouse takes place during daytime, eliminating the necessity to white-wash the plastic sheeting or of covering the greenhouse with sheets or the like. On the other hand, energy is saved at night.

The films and sheets of the invention transmit at least about 70 percent of the PAR, and preferably 75% or more of the PAR. It ought to be stressed that plants require at least 70% of the PAR in daylight solar radiation, otherwise crops suffer in a very pronounced manner. On the other hand, as explained hereinafter, it is highly desirable to cut out part of the near IR (i.e. in the $0.7\mu$ to about $2.0\mu$ range). Varying the ratio of PAR/NIR (near IR) substantially improves a number of parameters of plant growth: crops are increased and certain diseases (especially fungal afflictions) are reduced, as will be set out in detail hereinafter.

BACKGROUND OF THE INVENTION

Low density polyethylene (LDPE) is the least expensive polymer for the production of sheets and films and it is easy to produce films of from $30\mu$ to about $500\mu$ thickness and of a width of up to about 16 m by extrusion blowing. PE is quite transparent to visible light and to photosynthesis active radiation (PAR). Greenhouses covered with PE films lose much energy by radiation at night and frequently such greenhouses must be heated at nighttime.

The near infra-red (NIR) comprises 40% of the sun's radiation reaching the earth and it contributes to the heating up of the inside of greenhouses. In spring and winter crops in temperate climates, over-heating is a serious problem as it adversely affects certain plants. The energy in the visible range is adequate for crops in greenhouses.

The ratio of PAR/NIR in long day crops regulates the growth of plants such as tomatoes and cucumbers. PAR in the $0.4\mu$ to $0.7\mu$ range, and particularly the red $0.64\mu$ to $0.7\mu$ range and the NIR range of $0.7\mu$ to $1.5\mu$ particularly at about $0.73\mu$ are mutually antagonistic. A high PAR/NIR ratio delays maturation and results in a high chlorophyl and protein content of crops, see Naturwiss 63, 530 (1976) and Am.Rev.Plant Physiol 23 293-334 (1972). Various polymeric films incorporating inorganic IR absorbing materials in fine particulate form are known: French patent No. 1574088 (silicasilicates), U.S. Pat. No. 4,179,547 (sodium metaphosphates) and U.S. Pat. No. 4,134,875 (alunite/aluminum hydroxide).

Films containing magnesium oxide are also known: they have an effect in the IR, but none in the NIR which is the main range dealt with by films of the invention.

Alunite/aluminum hydroxide containing sheets tend to deteriorate, the particles absorb IR radiation in the polymer matrix and their heating up over prolonged periods of time results in a deterioration of film quality. U.S. Pat. No. 3,857,807 discloses thermoplastic films for controlling plant growth. It contains certain additives which prevent a substantial part of PAR from passing through the film while transmitting in the NIR. Films for agricultural use which absorb in the IR have been reported. Such films transmit in the PAR and absorb in the 7 to $15\mu$ range given off by soil and plants at nighttime in greenhouses thus decreasing heat losses by radiation. The IR and NIR ranges are quite different in their effects.

DESCRIPTION OF THE INVENTION

There are provided sheets or films (referred to in the following as sheets) of polymeric materials, for use as cover of agricultural structures such as greenhouses, plastic-sheet-covered tunnels and the like. The sheets of the invention are essentially transparent (above 70%) to photo-synthetic active radiation (PAR) while absorbing radiation or reflecting in the near infra-red region of $0.7\mu$ and $2\mu$, resulting in healthier plants and in higher crops with a decreased incidence of fungal attack. The films reflect at least 10% of energy in the NIR range. There can be used a variety of polymers which generally contain a UV radiation stabilizer, and into which there is incorporated an effective quantity of a substance which absorbs or reflects in the near infra-red (NIR). The additives of choice, which absorb or reflect in this region, are certain metal powders or metal oxides, in fine particle form. Suitable NIR absorbers or reflectors are metal powders such as powders of copper oxides such as black iron oxide, and cobalt oxide. These are used in a size in the submicron size or at a size of a few microns, not more than about $10\mu$.

It is advantageous to use commercially available coated copper powder, of a size of about 4 to $6\mu$ which results in films with superior stability over prolonged periods of time. Blue cobalt oxide, in the $1\mu$ to $2\mu$ range gave good results. The quantity of such materials incorporated into the polymer can vary between about 0.02 percent by weight to about 0.4 percent by weight, the preferred range being about 0.02 percent to about 0.3 percent by weight.

Amongst suitable polymers there may be mentioned polyolefins such as polyethylene (PE) containing a suitable IR absorber, ethylene copolymers, thermoplastic polyesters and copolymers of these, PVC (plasticized), polyacrylates, polycarbonates and ester-ether copolymers, especially esterether copolymers with PE. Very good results were obtained with thermoplastic copolyester ethers of the HYTRES (Du Pont) and ARNITEL (AKZO, Netherland)(T.M. type, in combination with low density polyethylene. There can also be used triple-layer films with two PE films at the outside and a polyesterether copolymer film in the middle. The use of Linear low density (LLD) PE imparts extra strong mechanical properties to the film. The films of the invention are generally UV stabilized by means of Hals Tinuvin 944 (CIBA-GEIGY) UV stabilizers and they contain an antioxidant and an antifogging agent.

Such films can be easily processed into sheets of about 30 to 500 micron ($\mu$) thickness, and preferably 50 to 150 $\mu$ thickness, with a width of up to about 16 meters, obtained by extrusion blowing and cutting open the resulting sleeve. The films of the invention generally allow a transmission of at least 75 percent of the PAR while absorbing a considerable percentage of the NIR radiation.

It is known that metal powders reflect, and that the reflective properties increase with an increase of the wavelength of the radiation. The compositions of the invention can also contain a suitable light diffuser, such as magnesium oxide.

Results obtained in greenhouse tests indicate a considerable increase of crops, adequate night temperatures without heating and a substantially decreased incidence of fungal attack, resulting in longer plant life and longer duration of crop development.

The increased yields are very substantial and of considerable economic value.

It may be mentioned that there may be incorporated in such sheets also other additives known in the art, such as pigments etc.

A variety of sheets was prepared and tested. The metal powders defined above were found to be suitable.

The above concentrations of metal particles and of metal oxide powders are by example only. Larger or smaller quantities can be used, the main criteria being that at least 70% of the energy in the PAR ought to pass, while at least 10 percent of energy in the NIR ought to be reflected or absorbed.

The sheets or films of the invention change the PAR/NIR ratio, and as a result healthier plants ar obtained which give higher crops. The plants are also more resistant to fungal disease.

Sheets and films of the present invention, and especially those made of polyethylene containing an IR absorber or of copolymer of low-density ethylene-vinyl-acetate or an ether-ester copolymer, are essentially opaque to radiation in the 7$\mu$ to 14$\mu$ range, which contains the main radiation energy from the soil and from plants at temperatures of about 10° C. to 20° C., mainly at nighttime, and this radiation is absorbed at nighttime and part of it is radiated back into the greenhouse, giving higher interior temperatures at night, saving fuel compared with ordinary polyethylene sheeting. It is advantageous to incorporate in such sheets a certain quantity of fine particle size magnesium oxide. This reflects at a rather sharp peak about 14$\mu$ of the spectrum, and its incorporation in the plastic sheets results in a decrease of heat loss from greenhouses at night-time. Magnesium oxide particles also diffuse transmitted light onto plants at daytime, which improves energy utilization by the plants.

The plastic sheets have a different effect during daytime and during nighttime.

During daytime about 20 percent of the radiation in the NIR (which term designates throughout the 0.7 $\mu$ to 2.0 $\mu$ region of the spectrum) is reflected or absorbed. The absorbed energy heats the plastic sheet and this energy is radiated at a much longer wavelength (heat) without appreciable effect on plants. During summertime the temperature of the sheet can reach about 40° C. while at the interior of the greenhouse the temperature remains a few degrees lower.

One of the effective NIR reflectors/absorbers is a type of mixed iron oxide also designated as "transparent iron oxides" which are produced by BAYER AG, Leverkusen, Germany under the Trade designation Bayferrox ® which exists in red, black, brown and yellow forms. Various types were tested and best results were obtained with a black Bayferrox ® designated as 303T which is a mixed iron oxide with about 58–60% $Fe_2O_3$, with spherical particle form and with an average particle size of predominantly 0.6$\mu$ (micron). This is used as component of plastic sheets of the invention, and excellent results were obtained with quantities in the range of from about 0.05% to about 0.2%, with best results in the 0.1% (by weight) range. At this value PAR transmittance is in the 75%+ range and NIR absorption and/or reflection is in the 10% or more range.

Iron oxides of this type are used for many years as fillers of plastic materials, also in sheet form. It is known that certain iron oxides can lead to a breakdown of polyethylene sheets, especially when Ni-compounds are used as UV stabilizers. Otherwise such films containing such iron oxides are stable under adverse conditions and over prolonged periods of time. Accelerated weathering tests, Q.U.V. (Q Panel Company) where samples are exposed to UV, temperature, water, which stimulate extreme weather conditions were carried out with sheets of the invention containing HALS (hindered amine light stabilizers) TINUVIN 944, Ciba-Geigy. Samples with Bayferrox 303T and with coated copper platelets demonstrated that even after 2000 hours, equivalent to about 2 years outdoors, the sheets were in an excellent condition. Uncoated copper particles resulted in sheet breakdown after about 300 hours. The test: QUV ASTM G-53-77. The advantageous effect of an increased PAR/NIR ratio on increase of photosynthesis is well documented, see for example Light Quality, Photo reception and Plant Strategy: H. Smith, Ann. .Rev Plant Phys (1982) 33, 481–518.

Best results were obtained with the Ferroxon Bayer Product in the 0.6$\mu$ particle size, with copper platelets (coated, superfine, produced by Atlantic Metal Co. which are in the 4 to 5$\mu$ platelet size range. The coated copper is sold under the designation Eterna Copper 125, superfine and the coated particles(platelets) are of about 8–9$\mu$ diameter. This is used in the concentration range of from about 0.01 to 0.3 weight-%, preferably in the 0.1–0.25 weight-% range. Good results were obtained with blue cobalt oxide in the 1 to 2$\mu$ particle size range. This is produced by Hoechst AG, Germany and marketed under the designation Rema Fin-Blue COB-AF-30.

Any type of sheets or films which allows for less than 70% transmission of solar energy in the PAR region (i.e. in the visible range) is unsuitable for agricultural use in greenhouses as plant growth is stunted and substantial reduction of crops results. Films of this type, with a 20-50 percent transmission in the visible range are useful for protection against solar radiation and for cooling purposes, but only for such purposes and cannot be used as covers of greenhouses

DESCRIPTION OF THE PREFERRED EMBODIMENT

The following examples illustrate the invention, but this is by way of example only and these are not to be construed in a limitative manner.

Temperatures are degrees Centigrade and parts are part by weight. In all examples absorption and reflection in the NIR was measured with a reflectance/absorption meter made by Electronic Designs Ltd., Isle of Wright U.K., to the specification No. RRE x 6351.

EXAMPLE 1

To 97.5 kg of INFRASOL 266 (low density polyethylene containing metaphosphate as IR absorber, and a conventional UV stabilizer, produced by Ginegar Plastics, Israel) there was added a mixture of 2.5 kg polyethylene into which there were dispersed 30 g of fine particle size mixed iron oxide (Ferroxon 303T, Bayer AG, Germany), of an average particle size (spherical) of about 0.6 microns, and 50 g of a commercial antioxidant. The mixture was mixed in a Banbury mixer until homogeneous and extrusion blown to a 100μ (micron) thick tubular film of 10 m circumference which was slit open to provide a 10 m wide sheet. Absorbance in the NIR (700 to 1100 nm) was about 10% and it transmitted about 80% of the PAR.

EXAMPLE 2

A run was carried out as in Example 1, but the 2.5 kg mixture contained instead of the iron-oxide a quantity of 30 g of commercially available coated copper powder produced by Atlantic Powdered Metals Inc. N.Y. U.S.A. which has an average particle size of about 8–9μ (uncoated: about 4–5μ). The particles have the shape of platelets. Processing was as in Example 1, and the film was of 100μ thickness and it was 10 meter wide. Reflection in the NIR was 12% and PAR transmittance was over 80 percent.

EXAMPLE 3

A quantity of 90 kg low density polyethylene (LDPE), stabilized with a UV stabilizer was mixed with 10 kg of Arnitel EM 460, a polyether-ester produced by AKZO Netherlands, stabilized against UV radiation in a Banbury mixer and there was added a quantity of 45 g of coated copper powder of the type used in Example 2. The mixture was extrusion blown to a sleeve of 10 meter circumference and 150 micron thickness, which was slit to give a sheet. The reflectance in the NIR was about 13.5% and PAR transmittance was better than 77%.

EXAMPLE 4

A mixture was prepared as in Example 3, but with 250 g of the same copper powder and with 200 g of magnesium oxide powder of about 2–3 micron particle size. The magnesium oxide has no influence in the NIR and none on the PAR/NIR ratio. It causes light reflection in the blue region which has an advantageous effect on plant growth.

The film reflected about 20 percent in the NIR and transmitted about 78 percent of the energy in the PAR. Working up was as in Example 3.

EXAMPLE 5: (Comparative Example)

90 kg of LDPE and 10 kg Arnitel EM 460 were blended in a Banbury mixer and extrusion blown to a sleeve of 10 meter circumference and 100 micron thickness, which was slit to form a sheet. This reflected about 4% of the energy in the NIR and transmitted about 90% of the energy in the PAR.

EXAMPLE 6

A quantity of 87 kg LDPE, 10 kg Arnitel EM 460 and 3 kg of a commercial antioxidant concentrate to which there was added 300 g of blue cobalt oxide in the 2 micron to 4 micron particle size range, were blended and worked up as in Example 5 to form a sheet of 10 meter width and 100 micron thickness. It reflected about 16% in the NIR and transmitted about 80 percent of the PAR.

EXAMPLE 7

A run was carried out as in Example 1 but with 200 g of Ferroxon 303T of median particle size of 0.6 microns. The 100 micron film absorbed about 20 percent in the NIR and transmitted about 75% of the energy in the PAR region.

EXAMPLE 8

A film was coextruded to give a 40μ layer of UV stabilized LDPE, a middle layer of 15 Arnitel EM 460 containing 0.3% of coated copper powder as in Example 2, and a 40μ layer of LDPE containing a commercial antifogging agent. The reflectance in the NIR was 20% and PAR transmittance was about 80 percent.

Various compositions were prepared according to the above, containing from about 20 g (0.02%) to about 300 g (0.3%) of the metal powder or metal oxide powder per 100 kg of the mixture. The thickness of the metal containing films produced varied between 15μ to about 500μ, the preferred thickness being about 50μ to about 150μ. Various tests indicate that these are useful as covers for greenhouse structures, for agricultural tunnels and the like.

All films chosen as covers absorbed in this range, the difference being that of the properties in the near infrared (NIR) range.

Field Tests

12 Greenhouses, each 15 meter long, 3.5 meter high and 5 meters wide, were covered by the chosen sheet type, according to the Example number. The chosen cover materials were compared with commercial thermic greenhouse film INFRASOL 266, produced by Ginegar Plastics Israel, which is an infrared absorbing film in the 7 to 15μ range.

Tomatoes were picked and weighed on the same day on all greenhouses. Ten tomatoes were picked at random of each greenhouse, and average weight was determined.

RESULTS

Day temperatures were taken at 12:00, 13:00, 14:00 hrs on 20 November and 8 December, in three greenhouses. Results are shown in the following Tables. The covers with iron-oxide that absorb the NIR heat-up during the day. Leaf temperature was higher when less NIR was transmitted.

Comment: The higher day temperature of leaves determines the increased rate of photosynthesis.

TABLE 1

| Cover | Temperature in C | | | |
| --- | --- | --- | --- | --- |
| | Ground | Air | Roof | Leaf* |
| On 8 December: | | | | |
| Infrasol 266 | 18-19-19 | 26-27-26 | 29-34-31 | 22-24-23 |
| Example 1 | 18-19-19 | 27-27-27 | 36-37-37 | 25-30-27 |
| Example 2 | 18-19-20 | 27-28-27 | 27-28-29 | 28-32-28 |
| Example 4 | 18-19-19 | 26-26-26 | 37-38-38 | 26-31-28 |
| Example 6 | 18-19-20 | 26-26-26 | 28-29-28 | 27-31-29 |
| Example 7 | 18-20-20 | 26-27-26 | 27-28-28 | 29-33-30 |
| On 20 November: | | | | |
| Infrasol 266 | 19-20-21 | 30-31-31 | 36-36-35 | 30-30-26 |
| Example 1 | 20-20-21 | 30-31-31 | 40-40-38 | 32-33-32 |
| Example 2 | 20-21-21 | 30-32-32 | 31-32-31 | 32-32-33 |
| Example 4 | 19-20-21 | 29-31-29 | 42-42-40 | 33-33-33 |
| Example 7 | 20-21-20 | 29-29-29 | 30-32-32- | 33-35-34 |

*Leaf temperature is average of 10 leaves.

TABLE 2

| | Cumulative Tomato Crop in kg (Average of 2 Greenhouses) | | | | | |
| --- | --- | --- | --- | --- | --- | --- |
| Date | Infrasol 266 | Ex. 1 0.03% Iron oxide | Ex. 2 0.03% Coated Copper | Ex. 5 comparative | Ex. 7 0.2% Iron oxide | Ex. 4 0.2% Copper |
| 31 Jan | 33.3 | 40.1 | 44.2 | 40.5 | 48.7 | 47.2 |
| 14 Feb | 119.3 | 150.6 | 155.0 | 125.7 | 143.4 | 141.1 |
| 28 Feb | 268.0 | 275.2 | 274.2 | 273.3 | 279.8 | 268.6 |
| 14 March | 458.2 | 475.3 | 482.1 | 430.2 | 485.2 | 480.0 |
| 31 March | 589.8 | 650.0 | 751.7 | 603.1 | 783.0 | 777.3 |
| 14 April | 686.9 | 767.7 | 841.0 | 730.2 | 934.3 | 908.7 |
| 1 May | 702.0 | 899.7 | 890.6 | 758.0 | 1074.4 | 1059.9 |

The above Table 2 shows the significant change in crops between greenhouses covered with sheets with reduced NIR transmission, particularly in January when fungal diseases develop.

In examples 1, 2 and significantly in 4 and 7 plants remain healthy and crops develop well into the month of June, while in Infrasol 266 and in Example 5 the plants have mostly succumbed to diseases by this month.

Field tests and also accelerated weathering tests indicated that the films of all of the examples of the invention retained their usefulness and mechanical strength after a period of two years. No appreciable deterioration took place under quite extreme weather conditions in Israel, with rather high summer temperatures and high intensity solar radiation with a much higher percentage of sunny days than in most European countries.

Field tests demonstrate a high utility of the novel films as regards crop production, reduction of incidence of fungal afflictions and other parameters, as set out in the following.

I claim:

1. A plastic sheet for use as a cover in greenhouses, in a tunnel used in agriculture and for similar agricultural uses, which comprises a polymer incorporating a UV radiation stabilizer and an absorber or reflector in the near infra-red (NIR) region of about 0.7 $\mu$ m to about 2.0 $\mu$ m, said absorber of reflector being a metal or metal oxide powder having a fine particle size in the submicron to few micron range, being selected from the group consisting of black iron oxide, blue cobalt oxide and coated copper powder, and being incorporated in the polymer in amounts such that the sheet transmits at least 70 percent of the photo-synthetic active radiation (PAR) having wavelengths in the 0.4 to 0.7 micron range and reflects or absorbs at least 10 percent of the energy in the near infra-red (NIR) range.

2. A plastic sheet according to claim 1, wherein the absorber of reflector is black iron oxide in the form of particles of about 0.6 microns.

3. A plastic sheet according to claim 1 wherein the absorber or reflector is coated copper in the form of platelets of about 4 to 6 microns diameter.

4. A plastic sheet according to claim 1 wherein the absorber or reflector is cobalt oxide in the form of particles in the 1 to 2 micron range.

5. A plastic sheet according to claim 1, wherein the metal oxide particles comprise from about 0.02 weight percent to about 0.4 weight percent of the plastic composition.

6. A plastic sheet according to claim 1, wherein the polymer is low-density polyolefin, olefin copolymer, thermoplastic polyester, polyvinyl chloride, polyacrylate, polycarbonate or a polyetherester polymer.

7. A plastic sheet according to claim 1, wherein the polymer sheet comprises a sandwich structure of one or more sheets as defined in claim 10 with a sheet of another polymer.

8. A plastic sheet according to claim 7 wherein the sheet in the sandwich structure containing the NIR reflector or absorber comprises a polyester-ether polymer.

9. A plastic sheet according to claim 7, wherein the sheet in the sandwich structure containing the NIR reflector or absorber comprises a polyester-ether polymer.

10. A plastic sheet according to claim 1 wherein said reflector is coated copper powder.

11. A plastic sheet according to claim 6, where the polymer sheet is made from a polyethylene and etherester copolymer.

* * * * *